(12) United States Patent
Moody et al.

(10) Patent No.: US 9,394,673 B2
(45) Date of Patent: Jul. 19, 2016

(54) SKIMMER SYSTEM

(71) Applicant: THIRSTY DUCK, LP, Trinity, FL (US)

(72) Inventors: Jonathan D. Moody, Hudson, FL (US); Raymond Charles Bellas, New Port Richey, FL (US)

(73) Assignee: THIRSTY DUCK, LP, Trinity, FL (US)

( * ) Notice: Subject to any disclaimer, the term of this patent is extended or adjusted under 35 U.S.C. 154(b) by 146 days.

(21) Appl. No.: 14/210,827

(22) Filed: Mar. 14, 2014

(65) Prior Publication Data

US 2014/0261712 A1 Sep. 18, 2014

Related U.S. Application Data

(60) Provisional application No. 61/791,999, filed on Mar. 15, 2013.

(51) Int. Cl.
| | |
|---|---|
| E03B 3/04 | (2006.01) |
| E03B 3/00 | (2006.01) |
| E02B 8/02 | (2006.01) |
| E02B 8/04 | (2006.01) |
| B01D 17/02 | (2006.01) |

(52) U.S. Cl.
CPC .............. *E03B 3/00* (2013.01); *B01D 17/0208* (2013.01); *E02B 8/023* (2013.01); *E02B 8/045* (2013.01); *E03B 3/04* (2013.01); *Y10T 137/0318* (2015.04); *Y10T 137/6966* (2015.04)

(58) Field of Classification Search
CPC ............ E02B 8/02; E02B 8/023; E02B 8/04; E02B 8/045; E02B 15/106; E03B 3/00; E03B 3/04; E03F 5/105; E03F 5/107
USPC ......... 210/122, 170.05, 170.09, 242.1, 747.6, 210/776; 405/96, 97, 127
See application file for complete search history.

(56) References Cited

U.S. PATENT DOCUMENTS

| | | | |
|---|---|---|---|
| 706,526 A | 8/1902 | Carlisle | |
| 930,903 A | 8/1909 | Tucker | |
| 1,457,637 A * | 6/1923 | Sievers | E02B 11/005 210/122 |
| 1,605,207 A * | 11/1926 | Bitte | F04B 53/1037 210/242.1 |
| 1,758,941 A | 5/1930 | Gibson | |
| 2,882,928 A | 4/1959 | Cogliati | |
| 3,311,129 A | 3/1967 | Binder | |
| 3,693,800 A | 9/1972 | Stanfield et al. | |
| 3,832,854 A | 9/1974 | Metts | |
| 3,927,534 A * | 12/1975 | Larson | E02B 1/006 405/127 |
| 4,015,629 A | 4/1977 | Morgan et al. | |
| 4,094,338 A | 6/1978 | Bauer | |
| 4,224,156 A | 9/1980 | Pardikes et al. | |

(Continued)

FOREIGN PATENT DOCUMENTS

DE         26 57 488         *  6/1978

*Primary Examiner* — Christopher Upton
(74) *Attorney, Agent, or Firm* — Larson & Larson, P.A.; Frank Liebenow; Patrick Ried

(57) ABSTRACT

A method and device for extracting fluid from a body of fluid is has a bellows with a feed system interfaced to a first end of the bellows. A floating head is interfaced to a distal second end of the bellows and has one or more buoyancy elements. The buoyancy elements cause the floating head to float at a surface of the fluid. One or more inlets on a lower surface of the floating head are in fluid communication with the distal second end of the bellows, such that, fluid from a stratum beneath the surface of the fluid is drawn into the inlet(s), passes through the bellows, and into the feed system.

8 Claims, 2 Drawing Sheets

(56) References Cited

U.S. PATENT DOCUMENTS

| | | | |
|---|---|---|---|
| 4,582,609 A * | 4/1986 | Hunter, III | B01D 35/05 210/170.05 |
| 4,718,449 A | 1/1988 | Ralph | |
| 4,802,592 A | 2/1989 | Wessels | |
| 5,104,528 A * | 4/1992 | Christie | C02F 1/006 210/242.1 |
| 5,133,854 A | 7/1992 | Horvath | |
| 5,498,348 A | 3/1996 | Plink | |
| 5,693,218 A * | 12/1997 | Yamamoto | E02B 15/106 210/122 |
| 5,820,751 A | 10/1998 | Faircloth, Jr. | |
| 6,224,753 B1 | 5/2001 | Marbach | |
| 6,238,577 B1 | 5/2001 | MacLaren | |
| 6,277,287 B1 | 8/2001 | Terrien et al. | |
| 6,660,170 B2 * | 12/2003 | Dreyer | E03B 3/04 210/170.05 |
| 6,905,611 B2 * | 6/2005 | Gustafsson | B01D 17/0214 210/122 |
| 6,997,644 B2 | 2/2006 | Fleeger | |
| 7,025,888 B2 * | 4/2006 | Thompson | B01D 17/0211 210/242.1 |
| 7,125,200 B1 | 10/2006 | Fulton | |
| 7,186,058 B2 | 3/2007 | Schulter | |
| 7,429,147 B2 | 9/2008 | Marchetti | |
| 7,762,741 B1 | 7/2010 | Moody | |
| 7,985,035 B2 | 7/2011 | Moody | |
| 8,043,026 B2 | 10/2011 | Moody | |
| 2003/0010727 A1 * | 1/2003 | Gunderson, III | E02B 15/06 210/170.05 |
| 2007/0227986 A1 * | 10/2007 | Gomez | B01D 21/0027 210/242.1 |
| 2008/0029446 A1 | 2/2008 | Van Schie | |

\* cited by examiner

SKIMMER SYSTEM

CROSS-REFERENCE TO RELATED APPLICATION

This application takes priority from U.S. provisional patent application Ser. No. 61/791,999, filed Mar. 15, 2013, and first named inventor Jonathan D. Moody.

FIELD

This invention relates to the field of fluids and more particularly to a system for extracting from an upper stratum of a fluid body.

BACKGROUND

There are many needs for extracting fluids from an upper portion of a body of such fluids. Often, when a body of fluid such as water is still, particulate matter settles to the bottom, forming a layer of silt or sludge. When a portion of the fluid is needed, for example drinking water, it is desired to prevent the silt or sludge from mixing with the fluid, so it is desired to access only the upper layers of the fluid.

There are also needs for extracting fluids from an upper portion of a body of fluids when the fluids include two different fluids, each having different specific gravities. One example of this is gasoline and water, in which gasoline has a lower specific gravity than water and floats over the water. In such, there are needs in which the gasoline needs to be taken from the body of fluid without taking the water.

In the past, various approaches to such extraction have been attempted, each with various degrees of success. For example, some prior attempts utilize flexible hoses that have buoyancy devices at one end to keep that end at the surface. This may work on a small scale, but in large operations such as supplying water to a small city from a river, hundreds of flexible hoses would be needed. Additionally, such a system would also extract debris that is floating on the river such as leaves, branches, plastic bags, etc., thereby causing clogging and/or reducing efficiencies of filters, etc.

What is needed is a system that will extract a fluid from an upper stratum of a body of such fluid.

SUMMARY

In one embodiment, a fluid extraction device is disclosed including a foundation submerged within the fluid that has a feed system passing through the foundation. The feed system is interfaced to a first end of a bellows. A floating head is interfaced to a distal second end of the bellows. The floating head has a buoyancy element that causes the floating head to float at a surface of the fluid. An inlet on a lower surface of the floating head is in fluid communication with the distal second end of the bellows such that fluid from a stratum beneath the surface of the fluid is drawn into the inlet, passes through the bellows, and into the feed system.

In another embodiment, a device for extracting fluid from a body of fluid is disclosed including, a bellows with a feed system interfaced to a first end of the bellows. A floating head is interfaced to a distal second end of the bellows and has one or more buoyancy elements. The buoyancy elements cause the floating head to float at a surface of the fluid. One or more inlets on a lower surface of the floating head are in fluid communication with the distal second end of the bellows, such that, fluid from a stratum beneath the surface of the fluid is drawn into the inlet(s), passes through the bellows, and into the feed system.

In another embodiment, a method for extracting fluid from a body of fluid is disclosed including, floating a floating head at the surface of the body of fluid and extracting fluid from beneath the surface of the body of fluid through an inlet in the floating head. The fluid is transferred from the floating head to a feed system through an extendable tube and the floating head is vented to air above the body of fluid.

In another embodiment, a system for extracting fluid from a body of fluid is disclosed including a tower. A first end of the tower interfaced to a floor of the body of fluid. A bellows is interfaced at a first end to a feed system. Guide wires/rods are provided, one end of each guide wire/rod is interfaced to a distal second end of the tower and an opposing end of each guide wire/rod is interfaced to the feed system. A floating head is interfaced to a distal second end of the bellows. A buoyancy element interfaced to the floating head causes the floating head to float at a surface of the fluid. The floating head has apertures, such that, each of the guide wire/rods pass through one of the apertures. An inlet is formed on a lower surface of the floating head and is in fluid communication with the distal second end of the bellows, such that, fluid from a stratum beneath the surface of the fluid is drawn into the inlet, passes through the bellows, and into the feed system.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
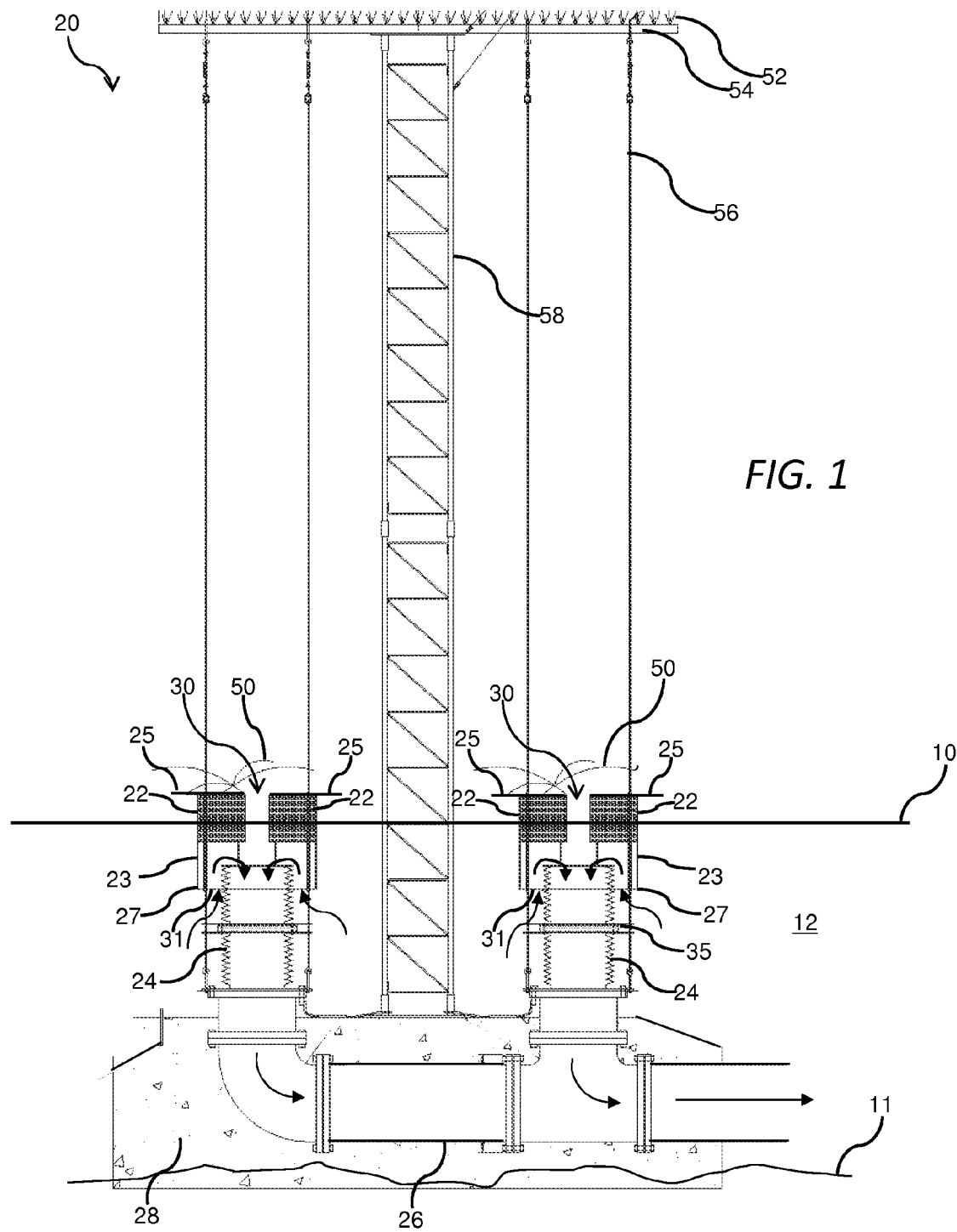
FIG. 1 illustrates a schematic view of a fluid extraction system.

Reference will now be made in detail to the presently preferred embodiments of the invention, examples of which are illustrated in the accompanying drawings. Throughout the following detailed description, the same reference numerals refer to the same elements in all figures.

Throughout this description, the skimming system 20 is shown and described as being installed in a fluid 12. Although the fluid 12 is frequently referred to as water, any fluid 12 is anticipated with or without dissolved solid particles such as silt, salt, vegetation, etc.

Throughout this description, the skimming system is shown and described using a bellows 24 as an example of an expandable tube 24, therefore, providing fluid flow internally while adjusting in length as the buoyancy head 23 raises and lowers responsive to changes in the fluid level 10. This is a preferred example, but does not limit the skimming system 20 to any particular expandable tube 24, as other types of expandable tubes 24 are equally anticipated such as telescoping expandable tubes 24, expandable tubes 24 having resilient walls without folds, etc.

Figure 2:
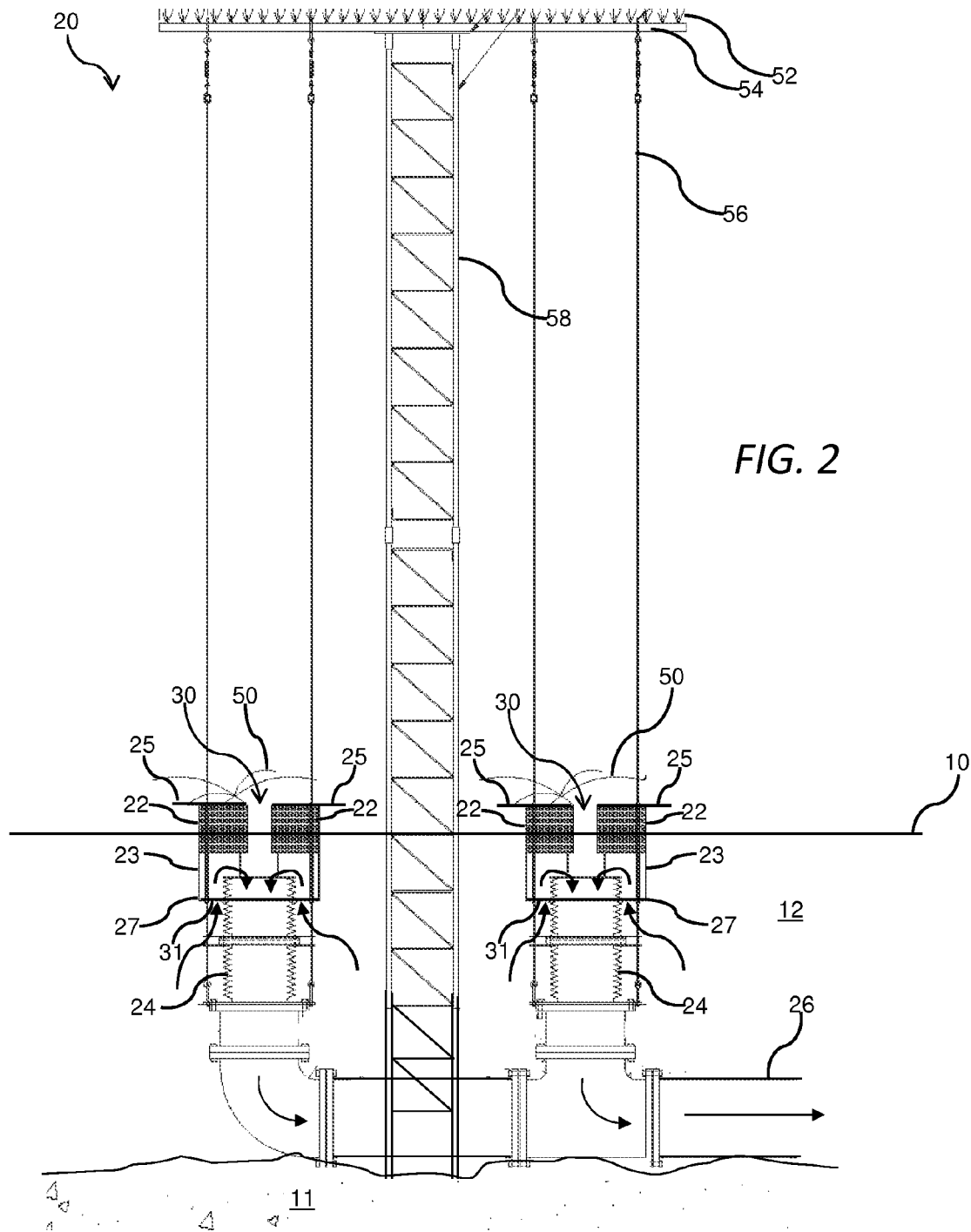
FIG. 2 illustrates a schematic view of a fluid extraction system with the tower embedded in the earth.

Referring to FIGS. 1 and 2, exemplary fluid extraction systems 20 are shown. Although any number of individual fluid extraction devices 20 is anticipated, the exemplary systems of FIGS. 1 and 2 show two fluid extraction devices 20, mounted side-by-side and secured in a foundation 28 resting on the floor 11 beneath the body of water 10 (FIG. 1) or footed into the floor 11 beneath the body of water 10 (FIG. 2). The system works equally well with a single fluid extraction device 20 or many fluid extraction devices 20.

Each fluid extraction device 20 includes a buoyancy element 22 affixed to or made as part of a floating head 23. In some embodiments, the upper edge 25 of the floating head 23 extends outwardly forming an animal block lip 25. The animal block lip 25 extends far enough beyond the side of the floating head 23 as to deter animal life from scaling the floating head 23 and resting atop the floating head 23. As shown in the exemplary FIGS. 1 and 2, any animal wishing to climb up onto the floating head 23 needs to travel upside down along the animal block lip 25, which is impossible for many animals such as alligators, many frogs, turtles, etc. The animal block lip helps prevent such animals from becoming lodged in the vents 30 or falling into the feed system 26.

Additionally, in some embodiments, a screen or grid 27 covers inlets 31 in the bottom of the floating head 23 to prevent small animals such as fish, baby alligators, reptiles, etc., from being sucked into the floating head 23.

A bellows element 24 fluidly interfaces the floating head 23 with the feed system 26. The feed system 26 is a fluid system that delivers the extracted fluid 12 to a destination. In some installations, the fluid system includes a pump (not shown) and associated filtration (not shown).

The buoyancy element 22 (e.g., a float, etc.), has a sufficiently lower specific gravity than the fluid 12 as to maintain the buoyancy element 22 and the floating head 23 at a submergence level such that the fluid 12 enters the head 23 below the fluid level 10 (as depicted by flow arrows) and flows into a first end of the bellows 24, flowing through the bellows 24 and exiting at a distal end of the bellows 24 into the feed system 26.

It is preferred that the buoyancy element 22 be sufficiently buoyant as to overcome any forces that pull the buoyancy element 22 and floating head 23 towards a further submerged configuration. One such force is the resilient action of the bellows 24. In other words, as the fluid level 10 rises, the buoyancy element 22 and floating head 23 rises, stretching the bellows 24. The bellows 24 have resiliency (e.g., the bellows 24 are elastic and are biased to the folded/retracted stated) and, therefore, the buoyancy element 22 must have sufficient buoyancy as to stretch the bellows 24 to sufficient length so that the top of the buoyancy element 22 and floating head 23, preferably, remains above the fluid surface 10.

In some embodiments, a secondary buoyancy element 35 is included, affixed to the bellows 24, to counteract the resilient effects of the bellows 24.

As is visible in FIG. 1, the fluid 12 preferably does not flow into the floating head 23 from the very surface 10 of the fluid 12, rather the fluid 12 flows from a stratum slightly below the surface 10 of the fluid 12 through inlets 31. In this way, less floating debris such as leaves, trash, plastic bags, insects, etc., are pulled into the floating head 23 and bellows 24. Likewise, other fluids that float on water such as gasoline and oil are not drawn into the inlets 31 of the floating head 23 and such contaminants remain on the surface 10 of the fluid (e.g. water) 12.

In a preferred embodiment, the buoyancy element 22 includes a vent 30 that releases any air that tends to form within the floating head 23. The vent 30 also serves as a port for inspection of the floating head 23 and removal of any debris there within.

In operation, it is anticipated and preferred that the entire length of the bellows 24 be filled with the fluid 12, thereby equalizing pressure from outside of the bellows 24 with pressure from within the bellows 24, thereby the fluid extraction device 20 will operate at great depths of fluid 12.

In some embodiments, to reduce malfunctions due to birds perching on the fluid extraction device 20, anti-bird features 50 are included, such as rigid wires 50 that will make perching upon the floating head 23 undesirable.

In some embodiments, to reduce skewing, the buoyancy elements 22 and floating heads 23 are guided by guides 56 and tower system 58/54 that includes a tower 58/54 and a series of guide rods/wires 56. When guide wires 56 are used, the guide wires 56 are tautly strung between the tower head 54 and the foundation 28, preferably perpendicular to the mean fluid surface 10. The guywires 56 pass through apertures in, for example, the buoyancy element 22 and floating head 23 such that the buoyancy element 22 and floating head 23 are free to move vertically along the guywires 56. The tower 58/54 and guides 56 help prevent the buoyancy element 22 and floating head 23 from swaying, especially during windy conditions.

In some embodiments, anti-bird barbs 52 are included to reduce bird perching on the tower head 54.

As a sample application, in a water storage pond or reservoir, it is desired to draw drinking water 12 from a top stratum of the water 12 below the water surface 10. This is desired over drawing from lower strata where silt or other materials have settled or drawing from the top surface 10 where floating debris and fluids such as oils are found. In this sample application, the fluid 12 is water 12. In the fluid extraction device 20 shown in FIG. 1, the foundation 28 is anchored at the floor of the reservoir and the tower 58/54 is configured for the expected range of water levels. At the water level 10 as shown in FIG. 1, as water 12 is pumped from the feed system 26, water 12 from an upper stratum of the water 12 enters the underside of the floating head 23 and through the bellows 24 to the feed system 26. As the water level 10 rises, the bellows 24 elongate and the buoyancy element(s) 22 lift the floating head 23 and water 12 from an upper stratum of the water 12 enters the underside of the floating head 23 and flow through the bellows 24 to the feed system 26. The opposite occurs as the water level 10 abates.

In FIG. 2, the tower mast 58 is anchored into the floor 11 of the reservoir and the tower 58/54 is, as above, configured for the expected range of water levels.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for extracting fluid from a body of fluid, the device comprising:
   a tower, a first end of the tower interfaced to a floor of the body of fluid;
   a bellows;
   a feed system interfaced to a first end of the bellows;
   guide wires/rods, one end of each guide wire/rod interfaced to a distal second end of the tower and an opposing end of each guide wire/rod interfaced to the feed system;
   a floating head interfaced to a distal second end of the bellows, the floating head having a buoyancy element, the buoyancy element causing the floating head to float at a surface of the fluid, the floating head having apertures, each of the guide wire/rod passing through one of the apertures; and an inlet on a lower surface of the floating head, the inlet in fluid communication with the distal second end of the bellows, such that fluid from a stratum beneath the surface of the fluid is drawn into the inlet, passes through the bellows, and into the feed system.

2. The device for extracting fluid of claim 1, further comprising a foundation submerged within the fluid.

3. The device for extracting fluid of claim 2, wherein the feed system passes through and is supported by the foundation.

4. The device for extracting fluid of claim 1, wherein the tower is affixed to the feed system.

5. The device for extracting fluid of claim 2, wherein the tower is affixed to the foundation.

6. The device for extracting fluid of claim 1, further comprising a screen covering the inlet on the lower surface of the floating head, thereby reducing intake of animals/debris.

7. The device for extracting fluid of claim 1, further comprising an animal block lip that extends beyond a side of the floating head, thereby deterring animals from climbing onto the floating head.

8. The device for extracting fluid of claim 1, further comprising anti-bird features, thereby deterring animals from resting on the floating head and/or the tower system.

* * * * *